United States Patent
Lo et al.

(10) Patent No.: US 7,404,058 B2
(45) Date of Patent: Jul. 22, 2008

(54) METHOD AND APPARATUS FOR AVOIDING COLLISIONS DURING PACKET ENQUEUE AND DEQUEUE

(75) Inventors: John M. Lo, Fremont, CA (US); Charles T. Cheng, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1326 days.

(21) Appl. No.: 10/448,960

(22) Filed: May 31, 2003

(65) Prior Publication Data

US 2004/0240459 A1     Dec. 2, 2004

(51) Int. Cl.
G06F 12/00  (2006.01)
G06F 5/10   (2006.01)
G06F 5/16   (2006.01)
H04L 12/56  (2006.01)

(52) U.S. Cl. .............. 711/168; 711/101; 711/110; 711/149; 711/150; 710/39; 710/52; 710/54; 370/229; 370/412

(58) Field of Classification Search .......... 711/101, 711/110, 147, 149, 150, 168; 370/229, 412; 710/7, 39, 52, 53, 54
See application file for complete search history.

(56) References Cited

U.S. PATENT DOCUMENTS

| | | | | |
|---|---|---|---|---|
| 5,483,657 A | * | 1/1996 | Hatakeyama | 712/27 |
| 6,192,422 B1 | * | 2/2001 | Daines et al. | 710/29 |
| 6,724,768 B1 | * | 4/2004 | Melvin | 370/412 |
| 6,947,445 B1 | * | 9/2005 | Barnhart | 370/468 |
| 7,200,111 B2 | * | 4/2007 | Garcia-Luna-Aceves et al. | 370/230 |
| 2002/0039364 A1 | * | 4/2002 | Kamiya et al. | 370/389 |
| 2002/0114277 A1 | * | 8/2002 | Kyusojin | 370/230.1 |
| 2002/0186678 A1 | * | 12/2002 | Averbuch et al. | 370/347 |

* cited by examiner

Primary Examiner—Jack A Lane
(74) Attorney, Agent, or Firm—Park, Vaughan & Fleming LLP

(57) ABSTRACT

A method and apparatus for enqueuing and dequeuing packets to and from a shared packet memory, while avoiding collisions. An enqueue process or state machine enqueues packets for a communication connection (e.g., channel, queue pair, flow). A dequeue process or state machine operating in parallel dequeues packets and forwards them (e.g., to an InfiniBand node). Packets are stored in the shared packet memory, and status/control information is stored in a control memory that is updated for each packet enqueue and packet dequeue. Prior to updating the packet and/or control memory, each process interfaces with the other to determine if the other process is active and/or to identify the other process' current communication connection. If the enqueue process detects a collision, it pauses (e.g., for a predetermined number of clock cycles). If the dequeue process detects a collision, it selects a different communication connection to dequeue.

37 Claims, 4 Drawing Sheets

METHOD AND APPARATUS FOR AVOIDING COLLISIONS DURING PACKET ENQUEUE AND DEQUEUE

BACKGROUND

This invention relates to the field of computer systems. More particularly, a method and apparatus are provided for avoiding contention when accessing memory during concurrent packet enqueue and dequeue operations.

A data center, a computing cluster, or other collection of computing assets often must interface with multiple networks or other communication links, and distribute communication traffic among different computing devices. For example, a data center may include an InfiniBand network fabric and one or more host computer systems. The InfiniBand systems may exchange communication traffic with other (e.g., remote) systems via a non-InfiniBand network or communication link (e.g., the Internet).

In this data center, a computing device may be assigned to handle the transfer of communications (e.g., packets) between the InfiniBand environment and the other (e.g., Internet Protocol or IP) environment. The computing device may be configured to receive inbound traffic and store it for forwarding to a host.

The process of storing a communication for forwarding is often termed enqueuing, while the process of removing and forwarding the communication is termed dequeuing. Collisions occur when the enqueue process needs to access an area of memory that the dequeue process also needs to access. Illustratively, this may occur if a packet being enqueued belongs to the same communication connection that the dequeue process needs to work with. For example, the dequeue process may visit each queue pair in turn (e.g., via round robin scheduling) to try and dequeue communications, and the target communication connection of the enqueue process may match the target communication connection of the dequeue process.

In such situations—when the same area of a shared memory needs to be accessed by different processes—an arbiter is traditionally employed to arbitrate access. However, use of an arbiter delays communication processing, especially if every access to the memory must be arbitrated. In addition, the memory may be able to support simultaneous access as long as the same area or address is not being targeted.

Therefore, there is a need for a method and apparatus for supporting concurrent access to shared memory while avoiding the cost involved in using an arbiter.

SUMMARY

In one embodiment of the invention, a method and apparatus are provided for enqueuing and dequeuing packets to and from a shared packet memory, while avoiding collisions. An enqueue process or state machine enqueues packets received for a communication connection (e.g., channel, queue pair, flow). A dequeue process or state machine operating concurrently with the enqueue process dequeues packets and forwards them (e.g., to an InfiniBand node) according to their communication connection.

Packets are stored in the shared packet memory, and status/control information is stored in a control memory that is updated for each packet enqueue and packet dequeue. Prior to updating the packet and/or control memory, each process interfaces with the other to determine if the other process is active and/or to identify the other process' current or active communication connection.

In this embodiment, if the enqueue process detects a collision, it pauses (e.g., for a predetermined number of clock cycles), and may then check again for a possible collision. If the dequeue process detects a collision, it selects a different communication connection to dequeue.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable storage media may include volatile (e.g., RAM) and/or non-volatile (e.g., ROM, disk) memory. Suitable computer-readable transmission media may include carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In an embodiment of the invention, an apparatus and method are provided for facilitating access to a shared memory during concurrently executing packet enqueue and packet dequeue operations. Other embodiments may be derived from the following descriptions for avoiding collisions between other types of processes needing access to shared memory.

Figure 1:
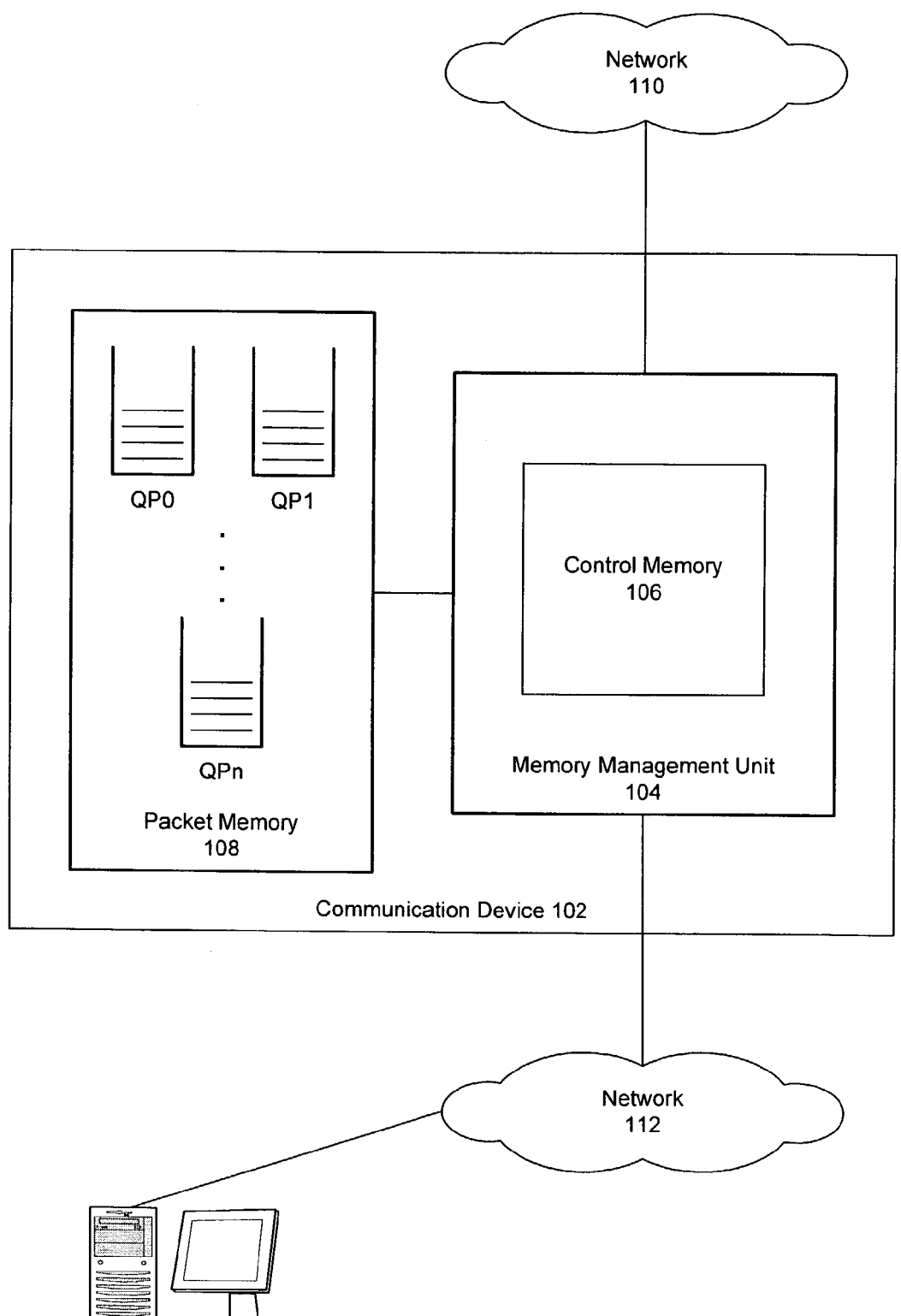
FIG. 1 is a block diagram depicting an apparatus for avoiding collisions during concurrent packet enqueue and dequeue operations, in accordance with an embodiment of the present invention.

FIG. 1 depicts an environment in which packets are received from one network or communication link, and temporarily stored for forwarding via another network or communication link, according to one embodiment of the invention. Communication device 102 of FIG. 1 may be a computer system, a switch, a router or other device capable of temporarily storing electronic communications.

Memory management unit (MMU) 104 of communication device 102 may comprise an application-specific integrated circuit (ASIC) or other logic for controlling the storage and forwarding of communications. Packet memory 108 is configured to store packets or other communications (e.g., cells, frames, datagrams). Illustratively, MMU 104 and packet memory 108 may be colocated on a network interface circuit (NIC), channel adapter or other communication interface.

MMU 104 includes control memory 106, which is configured to store information regarding communications stored in packet memory 108 and/or information regarding communication connections comprising those communications (e.g., queue pairs, channels, flows).

In the embodiment of FIG. 1, communication device 102 is configured to pass communications between an InfiniBand environment and another computing environment. Therefore, network 110 may comprise the Internet or another network compatible with virtually any communication protocols or protocol stack, such as TCP/IP (e.g., Transmission Control Protocol/Internet Protocol). Network 112 comprises an InfiniBand fabric or environment, including one or more InfiniBand hosts, such as host 114.

Because communication device 102 in the illustrated environment is configured to exchange communications with an InfiniBand environment, packet memory 108 is configured to segregate communications according to the InfiniBand queue pairs to which they belong. In one implementation of this embodiment of the invention, communication device 102 handles up to 64 queue pairs simultaneously. Therefore, packet memory 108 comprises up to 64 queues, one for each queue pair, and control memory 106 includes up to 64 entries—one for each queue pair.

A description is provided below of an embodiment of the invention as it may be implemented for to electronic communications received at communication device 102 from network 110, for transfer to network 112. In this embodiment, communications are enqueued (e.g., stored in packet memory 108) when received from network 110, and dequeued (e.g., retrieved from packet memory 108) when forwarded to network 112. A similar embodiment of the invention for communications flowing in the opposite direction may be readily derived from this description.

When a packet is enqueued or dequeued for a particular queue pair in packet memory 108, a corresponding entry in control memory 106 is updated to reflect the status of the queue pair and/or the queue pair queue. For example, an entry in the control memory may store information such as the location of the corresponding queue pair queue, its size, indications regarding how (or how not) to process packets received for the queue pair, etc.

Because packets are frequently or continually being enqueued in, and dequeued from, the packet memory, it is necessary to avoid or handle any collisions between the enqueue and dequeue processes. A collision may be detected when both processes need or attempt to access the same area of memory—the same queue pair queue in packet memory 108, and/or the same entry in control memory 106.

Figure 2:
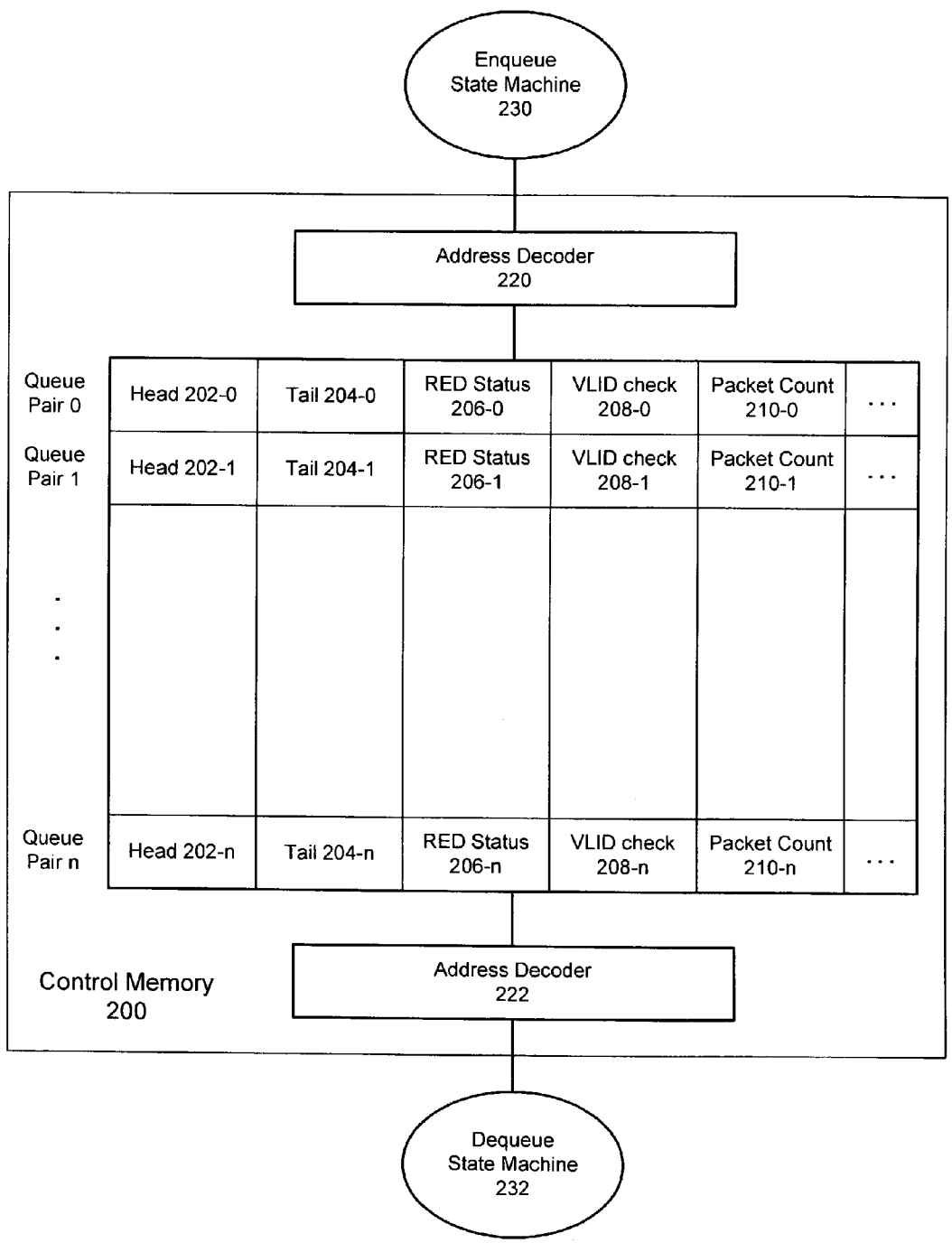
FIG. 2 is a block diagram of a shared memory supporting concurrent packet enqueue and dequeue operations, in accordance with an embodiment of the invention.

FIG. 2 depicts a control memory of a memory management unit (such as MMU 104 of FIG. 1) according to one embodiment of the invention. In this embodiment, packets are enqueued and dequeued on the basis of the InfiniBand queue pair to which they belong.

In this embodiment, enqueue state machine (or process) 230 controls or manages the process of enqueuing packets into a packet memory. Similarly, dequeue state machine (or process) 232 controls or manages the process of dequeuing packets from the packet memory. During enqueue and dequeue operations, the corresponding state machines update control memory 200. Illustratively, the enqueue and dequeue state machines may execute on a processor that is part of the MMU or communication device that contains control memory 200.

Control memory 200 includes two address decoders—address decoder 220 and address decoder 222. In this embodiment, the enqueue and dequeue state machines access the control memory through separate decoders. Thus, each state machine uses its own decoder for both read and write operations.

Each entry in control memory 200 includes multiple fields. Head of queue field 202 identifies the head of the corresponding queue pair queue in a packet memory. Thus, head 202-0 identifies the head of a queue (e.g., a circular queue, a linked list) for storing packets belonging to queue pair 0. Tail field 204 identifies the tail of the corresponding queue pair queue.

RED status 206 indicates whether or not Random Early Discard is active for the associated queue pair. If active, then a packet received for the queue pair may be dropped if the associated queue pair queue is full or is filled to or past a certain threshold. VLID check 208 specifies whether or not to check a packet's VLID (Virtual Lane Identifier) field to ensure that the packet truly belongs to the indicated queue pair.

Packet count field 210 reveals how many packets are currently stored in the corresponding queue pair queue and/or the maximum allowable size of the queue. Illustratively, different queue pairs may be allocated different queue sizes. Other information may also be stored in a control memory entry (e.g., whether to check or verify other fields, to indicate other actions to take).

As one skilled in the art will appreciate, enqueue state machine 230 and dequeue state machine 232 operate concurrently. Enqueue state machine 230 may enqueue packets into a packet memory in the order they are received (e.g., from network 110 of FIG. 1). Meanwhile, dequeue state machine 232 may dequeue packets from queue pair queues in round robin fashion or some other order. Because the order of packet arrival and the queue pairs to which they belong are not known beforehand, the state machines may attempt to, or need to, access the same queue pair entry in control memory 200 (and/or the same queue pair queue) at the same time.

One skilled in the art will recognize that in two-port memories such as control memory 200, one address decoder is usually used for read operations, while the other is used for write operations. Further, an arbiter is typically required to arbitrate access to the shared memory for enqueue and dequeue operations, which adds latency to the process of accessing the memory.

In the embodiment of FIG. 2, however, the enqueue and dequeue state machines communicate with each other to avoid collisions. Thus, no arbiter is required. Instead, each state machine, when it is about to access control memory 200 (or the associated packet memory), checks with the other state machine to see if there may be a collision.

Illustratively, each state machine is able to identify to the other at least two things: whether the state machine is active (e.g., currently trying to enqueue or dequeue a packet) and the queue pair it is working on or about to work on. The state machines may communicate directly with each other, or may interface through some entity other than an arbiter.

Thus, by querying or communicating with the other state machine, a state machine needing to access a particular entry can tell whether the other state machine is altering that entry. If no collision is detected, each state machine can continue its operations.

If, however, a collision is detected, the way it is handled depends on which state machine detects the collision. If the collision is detected by enqueue state machine 230, it will pause for a random or predetermined period of time (e.g., six clock cycles) and try again. The enqueue state machine will wait because, in this embodiment, it enqueues packets in the order they are received.

If the dequeue state machine detects a collision, it may simply skip its current queue pair and go to the next. In this embodiment, the dequeue state machine may ordinarily dequeue packets in round robin order. Therefore, it need not wait for a particular queue pair entry to become available.

Figure 3A:
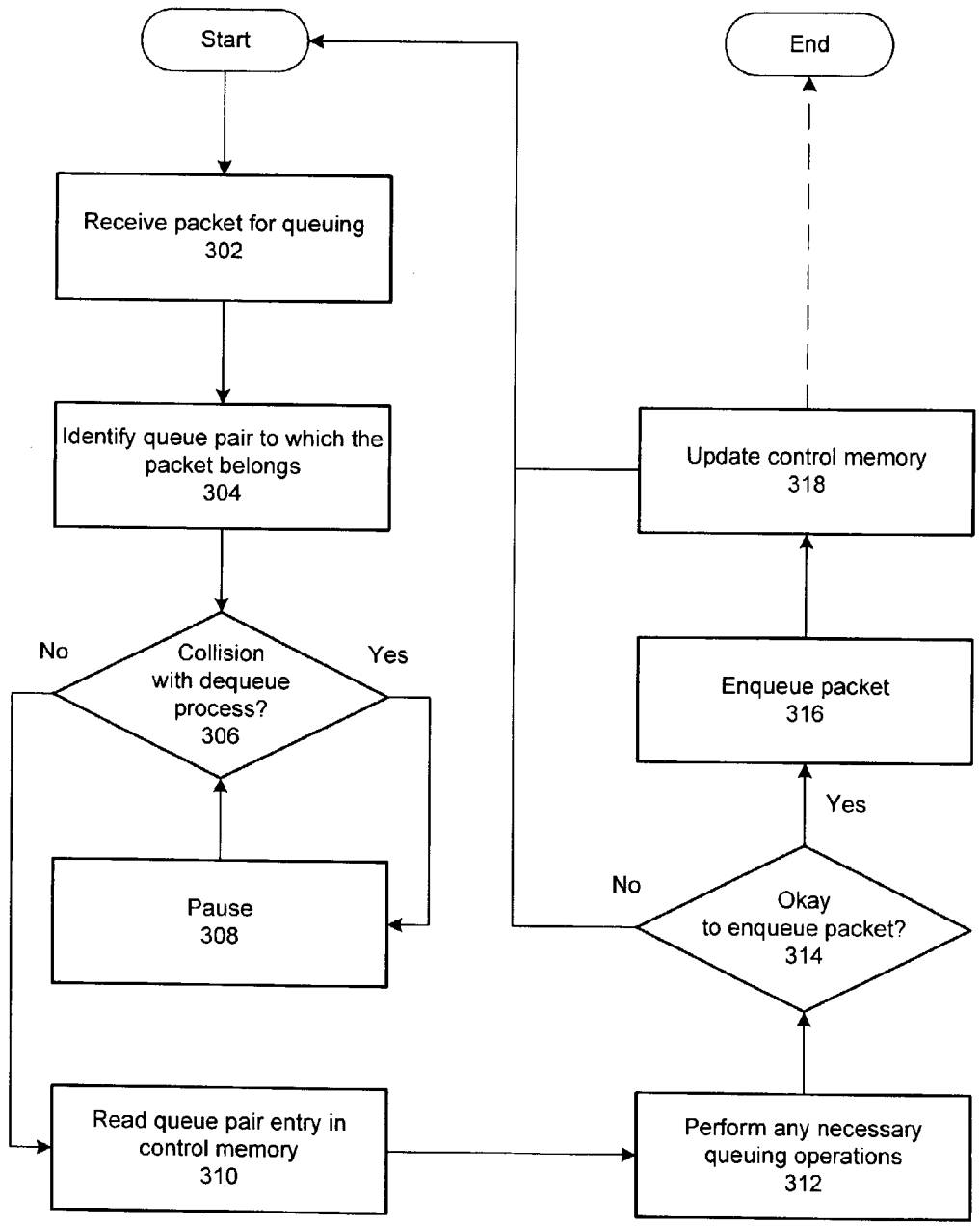
FIGS. 3A-B are flowcharts illustrating methods of avoiding collisions during concurrent packet enqueue and dequeue operations, in accordance with an embodiment of the invention.
Figure 3B:
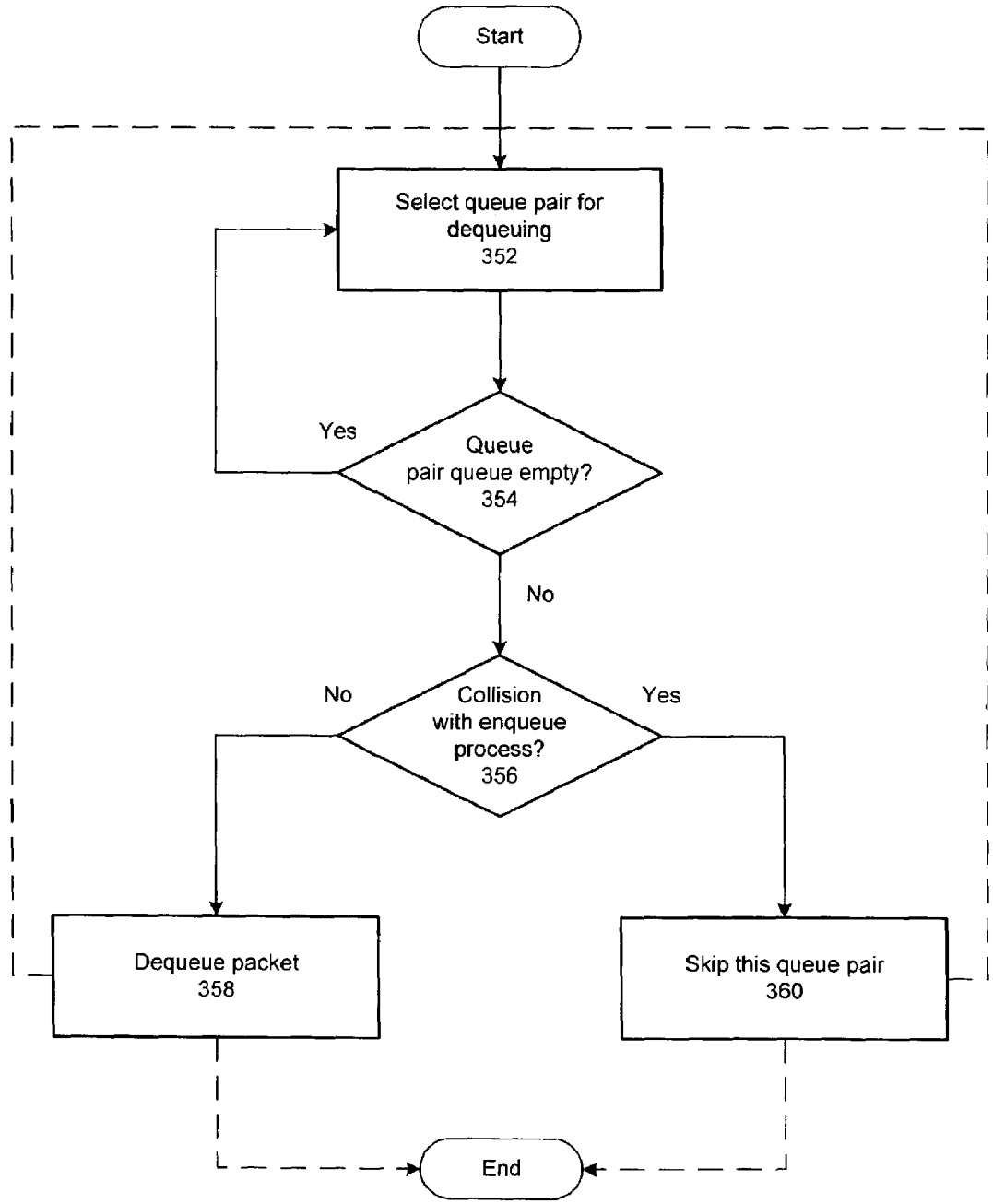

FIGS. 3A-B are flow charts demonstrating illustrative methods of enqueuing and dequeuing packets while avoiding collisions, according to one embodiment of the invention. The described methods are configured for use in handling packets being transferred to an InfiniBand environment from a non-InfiniBand environment. Other methods may be derived from the following description for systems handling packets flowing in the opposite direction or between other types of communication environments.

FIG. 3A demonstrates a method of enqueuing a packet. In operation 302, a packet is received for the InfiniBand environment (e.g., it is addressed to an InfiniBand node). The packet may be processed through an input port processor (e.g., to remove a layer one header) and/or other modules before being received by a memory management unit.

In operation 304, the packet is examined to determine which InfiniBand queue pair (or other communication connection) the packet belongs to. This may entail accessing one or more fields of the packet's headers.

In operation 306, an enqueue process or state machine determines whether it may collide with a dequeue process or state machine. In particular, the enqueue process determines whether its current queue pair (i.e., the queue pair of the received packet) matches the dequeue process' current queue pair, or whether the dequeue process is accessing the same entry in the control memory or the same queue pair queue in the packet memory.

In the illustrated method, the enqueue process queries or otherwise communicates with the dequeue process to learn the dequeue process' current queue pair and/or whether the dequeue process is active. In this method, if the dequeue process is not active, or is not working on the same queue pair, the method advances to operation 310.

Otherwise, in operation 308, the enqueue process pauses for a random or predetermined period of time (e.g., six clock cycles), then returns to operation 306 to determine if there is still a collision.

In operation 310, an entry in a control memory (e.g., control memory 200 of FIG. 2) corresponding to the received packet's queue pair is read. This allows a module processing the packet (e.g., a memory management unit) to locate a queue pair queue in which the packet may be stored, and obtain status or handling information regarding the queue pair. For example, the control memory entry may indicate that one or more fields of the packet should be verified, that random early discard may be performed on the packet, that the queue pair queue is full, etc.

Based on the information retrieved in operation 310, in operation 312 any necessary enqueuing operations are performed on the packet (e.g., perform random early discard, check the packet's VLID, check for space in the queue pair's queue).

In operation 314, a determination is made (e.g., by the memory management unit) as to whether the packet can not be enqueued. Thus, if the packet is not be random-early-discarded, and if the packet's VLID is verified and there is room in the queue pair queue, the illustrated method may continue with operation 316. Otherwise, the method may turn to the next packet, or may end.

In operation 316, the enqueue process enqueues the packet by storing it in the queue pair queue identified by the control memory. In operation 318, the enqueue process updates the control memory for the queue pair (e.g., to adjust the head and/or tail of the queue pair queue, adjust the size of the queue). After operation 318, the illustrated method may end or proceed to the next received packet.

In an alternative embodiment of the invention, operations 306 and 310 may be performed simultaneously or substantially simultaneously, in order to make the enqueue process more efficient. That is, the enqueue process may read the control memory at the same time that it interfaces with the dequeue process to determine whether there is a collision.

FIG. 3B demonstrates a method of dequeuing a packet. In operation 352, an InfiniBand queue pair is selected via round robin or some other scheduling scheme. In embodiments of the invention configured for other communication environments, different types of communication connection are worked with.

In operation 354, a dequeue process determines whether a queue corresponding to the selected queue pair in a packet memory is empty. If the queue pair queue that stores packets for the queue pair is empty, the illustrated method returns to operation 352 to select the next queue pair.

Otherwise, in operation 356, the dequeue process determines whether it will collide with an enqueue process. In this embodiment, the dequeue process communicates directly with the enqueue process to determine if the enqueue process is active and/or to identify which queue pair it is currently working with. If a collision is detected, the method advances to operation 360.

Otherwise, if no collision is detected, the method continues at operation 358, wherein one or more packets are dequeued from the queue pair queue and forwarded toward an InfiniBand node. After operation 358, the illustrated method may end or return to operation 352 to select the next queue pair to dequeue.

In operation 360, the dequeue process has detected a collision and therefore skips the current queue pair. The method may then either end or return to operation 352 to apply the dequeue process to the next selected queue pair.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of avoiding collisions while enqueuing and dequeuing packets in a memory, comprising:
   maintaining a packet memory for queuing packets belonging to one or more communication connections;
   operating an enqueue process configured to enqueue packets in the packet memory;

operating a dequeue process configured to dequeue packets from the packet memory;

receiving a first packet via a first communication link;

identifying a first communication connection to which the packet belongs;

prior to enqueuing the first packet in the packet memory, exchanging information between the enqueue process and the dequeue process to determine if said enqueuing would collide with a dequeuing of a previously enqueued packet belonging to the first communication connection;

if said enqueuing would collide with said dequeuing of a previously enqueued packet, pausing said enqueuing; and prior to dequeuing the first packet from the packet memory, exchanging information between the dequeue process and the enqueue process to determine if said dequeuing would collide with an enqueuing of a second packet belonging to the first communication connection.

2. The method of claim 1, wherein said exchanging information comprises:

communicating directly between the enqueue process and the dequeue process.

3. The method of claim 1, further comprising, if said dequeuing would collide with said enqueuing of the second packet:

halting said dequeuing of the first packet; and selecting a different communication connection for which to dequeue a packet from the packet memory.

4. The method of claim 1, wherein the packet memory comprises a queue for each of the one or more communication connections.

5. The method of claim 4, further comprising:

maintaining a control memory comprising an entry corresponding to each of the one or more communication connections;

wherein each entry comprises information configured to facilitate said enqueuing and said dequeuing.

6. The method of claim 5, wherein the enqueue process is configured to:

enqueue a received packet in the packet memory; and update an entry in the control memory corresponding to the communication connection to which the received packet belongs, to reflect the enqueuing of the received packet.

7. The method of claim 5, wherein the dequeue process is configured to:

dequeue a packet from the packet memory; and update an entry in the control memory corresponding to the communication connection to which the dequeued packet belongs, to reflect the dequeuing of the dequeued packet.

8. The method of claim 1, wherein:

the enqueue process is configured to communicate directly with the dequeue process to determine whether the dequeue process is active; and the dequeue process is configured to communicate directly with the enqueue process to determine whether the enqueue process is active.

9. The method of claim 1, wherein:

the enqueue process is configured to communicate directly with the dequeue process to identify the dequeue process' current communication connection; and the dequeue process is configured to communicate directly with the enqueue process to identify the enqueue process' current communication connection.

10. A computer readable storage medium storing instructions that, when executed by a computer, cause the computer to perform a method of avoiding collisions while enqueuing and dequeuing packets in a memory, the method comprising:

maintaining a packet memory for queuing packets belonging to one or more communication connections;

operating an enqueue process configured to enqueue packets in the packet memory;

operating a dequeue process configured to dequeue packets from the packet memory;

receiving a first packet via a first communication link;

identifying a first communication connection to which the packet belongs;

prior to enqueuing the first packet in the packet memory, exchanging information between the enqueue process and the dequeue process to determine if said enqueuing would collide with a dequeuing of a previously enqueued packet belonging to the first communication connection;

if said enqueuing would collide with said dequeuing of a previously enqueued packet, pausing said enqueuing; and prior to dequeuing the first packet from the packet memory, exchanging information between the dequeue process and the enqueue process to determine if said dequeuing would collide with an enqueuing of a second packet belonging to the first communication connection.

11. A method of managing the enqueuing of a packet in a memory, the method comprising:

receiving a first packet to be enqueued in a memory;

identifying a first communication connection comprising the packet;

prior to enqueuing the first packet in the memory for the first communication connection, determining whether said enqueuing would collide with a dequeuing of a packet previously enqueued in the memory for the first communication connection; and if said enqueuing would collide with said dequeuing, pausing said enqueuing.

12. The method of claim 11, further comprising:

repeating said determining after said pausing.

13. The method of claim 11, wherein said pausing comprises pausing said enqueuing for a predetermined period of time.

14. The method of claim 11, wherein said pausing comprises pausing said enqueuing for a random period of time.

15. The method of claim 11, wherein said determining comprises:

communicating directly between an enqueue process configured to perform said enqueuing and a dequeue process configured to perform said dequeuing.

16. The method of claim 15, wherein said communicating comprises:

determining whether said dequeue process is active.

17. The method of claim 15, wherein said communicating comprises:

determining whether a current communication connection of said dequeue process is the first communication connection.

18. The method of claim 15, wherein said communicating comprises:

determining whether a first memory address to be accessed during said enqueuing matches a second memory address to be accessed during said dequeuing.

19. The method of claim 18, wherein said first memory address and said second memory address are addresses in the memory.

20. The method of claim 18, wherein said first memory address and said second memory address are addresses in a control memory configured to store control data for facilitating management of the memory.

21. The method of claim 11, wherein said receiving a first packet comprises receiving a first packet addressed to an InfiniBand network from a non-InfiniBand network.

22. The method of claim 21, wherein:
the first communication connection is a first queue pair; and
the memory comprises, for each of a plurality of queue pairs, including the first queue pair, a queue configured to store packets belonging to the queue pair.

23. The method of claim 22, further comprising:
maintaining a control memory comprising an entry corresponding to each of the plurality of queue pair queues;
wherein each entry comprises control data for facilitating management of the corresponding queue pair queue.

24. An apparatus for enqueuing and dequeuing electronic communications while avoiding memory collisions during the enqueuing and dequeuing, the apparatus comprising:
a packet memory configured to queue packets belonging to multiple communication connections;
a control memory configured to store status information for each of the multiple communication connections;
an enqueue process configured to:
enqueue in the packet memory a packet received from a first communication link as part of a first communication connection; and
update an entry in the control memory corresponding to the first communication connection; and
a dequeue process configured to:
dequeue the packet for forwarding via a second communication link; and
update said entry in the control memory;
wherein said enqueue process and said dequeue process exchange information to avoid a memory collision while updating said entry.

25. The apparatus of claim 24, wherein said enqueue process and said dequeue process exchange information directly, without arbitration.

26. The apparatus of claim 24, wherein said packet memory comprises:
for each of the multiple communication connections, a corresponding queue configured to store packets belonging to the communication connection.

27. The apparatus of claim 26, wherein said control memory comprises:
an entry for each of the multiple communication connections;
wherein each entry comprises control information for facilitating, within the corresponding queue, the enqueuing and dequeuing of packets belonging to the communication connection.

28. The apparatus of claim 24, wherein:
said enqueue process is configured to determine, by interfacing with said dequeue process, whether said dequeue process is active; and
said dequeue process is configured to determine, by interfacing with said enqueue process, whether said enqueue process is active.

29. The apparatus of claim 24, wherein:
said enqueue process is configured to determine, by interfacing with said dequeue process, which of the multiple communication connections is the dequeue process' current communication connection; and
said dequeue process is configured to determine, by interfacing with said enqueue process, which of the multiple communication connections is the enqueue process' current communication connection.

30. The apparatus of claim 24, wherein:
the second communication link comprises a link toward an InfiniBand node;
the first communication link comprises a link toward a non-InfiniBand network; and
the communication connections comprise InfiniBand queue pairs.

31. The apparatus of claim 24, wherein said control memory comprises:
a first address decoder used for all accesses to the control memory by said enqueue process; and
a second address decoder used for all accesses to the control memory by said dequeue process.

32. A communication device for temporarily queuing packets and avoiding collisions while enqueuing and dequeuing the packets, the device comprising:
a packet memory comprising, for each of one or more communication connections, a queue configured to store packets that are part of the communication connection;
a control memory comprising, for each of the one or more communication connections, a corresponding entry configured to facilitate enqueuing and dequeuing of packets within the corresponding packet memory queue;
an enqueue process configured to:
enqueue a packet from a first communication connection in a first queue of said packet memory; and
update a corresponding first entry in said control memory to reflect said enqueuing; and
a dequeue process configured to:
dequeue the packet from the first queue; and
update said corresponding first entry to reflect said dequeuing;
wherein each of said enqueue process and said dequeue process is further configured to communicate with the other said process to avoid colliding during said enqueuing and said dequeuing.

33. The communication device of claim 32, wherein said corresponding entry in said control memory comprises:
an identifier of the head of said first queue;
an identifier of the tail of said first queue; and
one or more indicators configured to identify packet processing operations to perform on a packet.

34. The communication device of claim 32, wherein:
said enqueue process is configured to determine, by communicating with said dequeue process, whether said dequeue process is active; and
said dequeue process is configured to determine, by communicating with said enqueue process, whether said enqueue process is active.

35. The communication device of claim 32, wherein:
said enqueue process is configured to determine, by communicating with said dequeue process, which of the one or more communication connections is the dequeue process' current communication connection; and
said dequeue process is configured to determine, by communicating with said enqueue process, which of the one or more communication connections is the enqueue process' current communication connection.

36. The communication device of claim 32, further comprising:
a first communication link configured to received the packet from a first network; and a second communication link configured to forward the packet toward an InfiniBand node;

wherein the communication connections comprise InfiniBand queue pairs.

37. The communication device of claim 32, wherein said control memory comprises:

a first address decoder used for all accesses to the control memory by said enqueue process; and a second address decoder used for all accesses to the control memory by said dequeue process.

* * * * *